United States Patent
Tomimatsu

(10) Patent No.: US 12,528,295 B2
(45) Date of Patent: Jan. 20, 2026

(54) LIQUID EJECTION APPARATUS AND CONTROL METHOD FOR LIQUID EJECTION APPARATUS

(71) Applicant: SEIKO EPSON CORPORATION, Tokyo (JP)

(72) Inventor: Hiroyuki Tomimatsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 232 days.

(21) Appl. No.: 18/457,809

(22) Filed: Aug. 29, 2023

(65) Prior Publication Data
US 2024/0066875 A1  Feb. 29, 2024

(30) Foreign Application Priority Data

Aug. 31, 2022 (JP) ................. 2022-138296

(51) Int. Cl.
*B41J 2/165* (2006.01)
*B41J 2/21* (2006.01)
*G06F 3/12* (2006.01)

(52) U.S. Cl.
CPC ....... *B41J 2/16579* (2013.01); *B41J 2/16508* (2013.01); *B41J 2/16544* (2013.01); *B41J 2/2114* (2013.01); *G06F 3/121* (2013.01); *G06F 3/1234* (2013.01)

(58) Field of Classification Search
CPC . B41J 2/16579; B41J 2/16508; B41J 2/16517
See application file for complete search history.

(56) References Cited

U.S. PATENT DOCUMENTS

| | | |
|---|---|---|
| 2004/0257418 A1* | 12/2004 | Doi .............. B41M 5/0017 |
| | | 347/100 |
| 2006/0055730 A1 | 3/2006 | Ono et al. |
| 2014/0097267 A1 | 4/2014 | Shitara et al. |
| 2017/0050204 A1 | 2/2017 | Shitara et al. |
| 2017/0080714 A1 | 3/2017 | Suzuki et al. |
| 2018/0037030 A1 | 2/2018 | Suzuki et al. |

(Continued)

FOREIGN PATENT DOCUMENTS

| | | | | |
|---|---|---|---|---|
| CN | 103129148 B | * | 1/2016 | ............ B41J 2/2142 |
| JP | 2006-110987 A | | 4/2006 | |
| JP | 2014-184577 A | | 10/2014 | |

(Continued)

*Primary Examiner* — Sharon Polk
(74) *Attorney, Agent, or Firm* — WORKMAN NYDEGGER

(57) ABSTRACT

A liquid ejection apparatus includes an ejection unit including a first ejection unit having a first nozzle surface in which a first nozzle is opened, the first ejection unit being configured to eject a first liquid from the first nozzle onto a medium, and a second ejection unit having a second nozzle surface in which a second nozzle is opened, the second ejection unit being configured to eject a second liquid from the second nozzle onto a medium, the second liquid containing a component for coagulating the first liquid, a detection unit configured to detect contact between the ejection unit and a medium, and a notification unit configured to perform notification of information for prompting confirmation of the first nozzle surface and the second nozzle surface when the detection unit detects contact between the ejection unit and a medium.

9 Claims, 5 Drawing Sheets

(56) References Cited

U.S. PATENT DOCUMENTS

2018/0215142 A1\* 8/2018 Ishikawa .............. B41J 11/0095
2021/0276334 A1   9/2021 Mizutani et al.

FOREIGN PATENT DOCUMENTS

| JP | 2015-027657 A | 2/2015 |
| JP | 2018-122517 A | 8/2018 |
| JP | 2020-019283 A | 2/2020 |
| JP | 2021-137991 A | 9/2021 |

\* cited by examiner

| ADHESION POSITION | RECOVERY PROCESSING |
|---|---|
| FIRST POSITION | FIRST PROCESSING |
| SECOND POSITION | SECOND PROCESSING |
| THIRD POSITION | THIRD PROCESSING |

LIQUID EJECTION APPARATUS AND CONTROL METHOD FOR LIQUID EJECTION APPARATUS

The present application is based on, and claims priority from JP Application Serial Number 2022-138296, filed Aug. 31, 2022, the disclosure of which is hereby incorporated by reference herein in its entirety.

BACKGROUND

1. Technical Field

The present disclosure relates to a liquid ejection apparatus and a control device for a liquid ejection apparatus.

2. Related Art

JP-A-2018-122517 describes a liquid ejection apparatus including an ejection unit that ejects a liquid onto a medium and a detection unit that detects contact between the medium and the ejection unit.

Such a liquid ejection apparatus has a possibility that a foreign material may adhere to the ejection unit when the medium contacts with the ejection unit. A problem relating to ejection of a liquid may arise depending on an adhesion position of a foreign material.

SUMMARY

In order to solve the above-mentioned problem, a liquid ejection apparatus includes an ejection unit including a first ejection unit having a first nozzle surface in which a first nozzle is opened, the first ejection unit being configured to eject a first liquid from the first nozzle onto a medium, and a second ejection unit having a second nozzle surface in which a second nozzle is opened, the second ejection unit being configured to eject a second liquid from the second nozzle onto a medium, the second liquid containing a component for coagulating the first liquid, a detection unit configured to detect contact between the ejection unit and a medium, and a notification unit configured to perform notification of information for prompting confirmation of the first nozzle surface and the second nozzle surface when the detection unit detects contact between the ejection unit and a medium.

In order to solve the above-mentioned problem, a control method for a liquid ejection apparatus including an ejection unit including a first ejection unit having a first nozzle surface in which a first nozzle is opened, the first ejection unit being configured to eject a liquid from the first nozzle onto a medium, and a second ejection unit having a second nozzle surface in which a second nozzle is opened, the second ejection unit being configured to eject a coagulating liquid from the second nozzle onto a medium, the coagulating liquid containing a component for coagulating the liquid, the control method includes detecting contact between the ejection unit and a medium, and performing notification of information for prompting confirmation of the first nozzle surface and the second nozzle surface when contact between the ejection unit and a medium is detected.

DESCRIPTION OF EMBODIMENTS

With reference to the drawings, an example of a liquid ejection apparatus is described below. The liquid ejection apparatus is, for example, an ink jet-type printer that performs printing of an image such as characters and photographs on a medium such as a sheet and fabric by ejecting a liquid.

Figure 1:
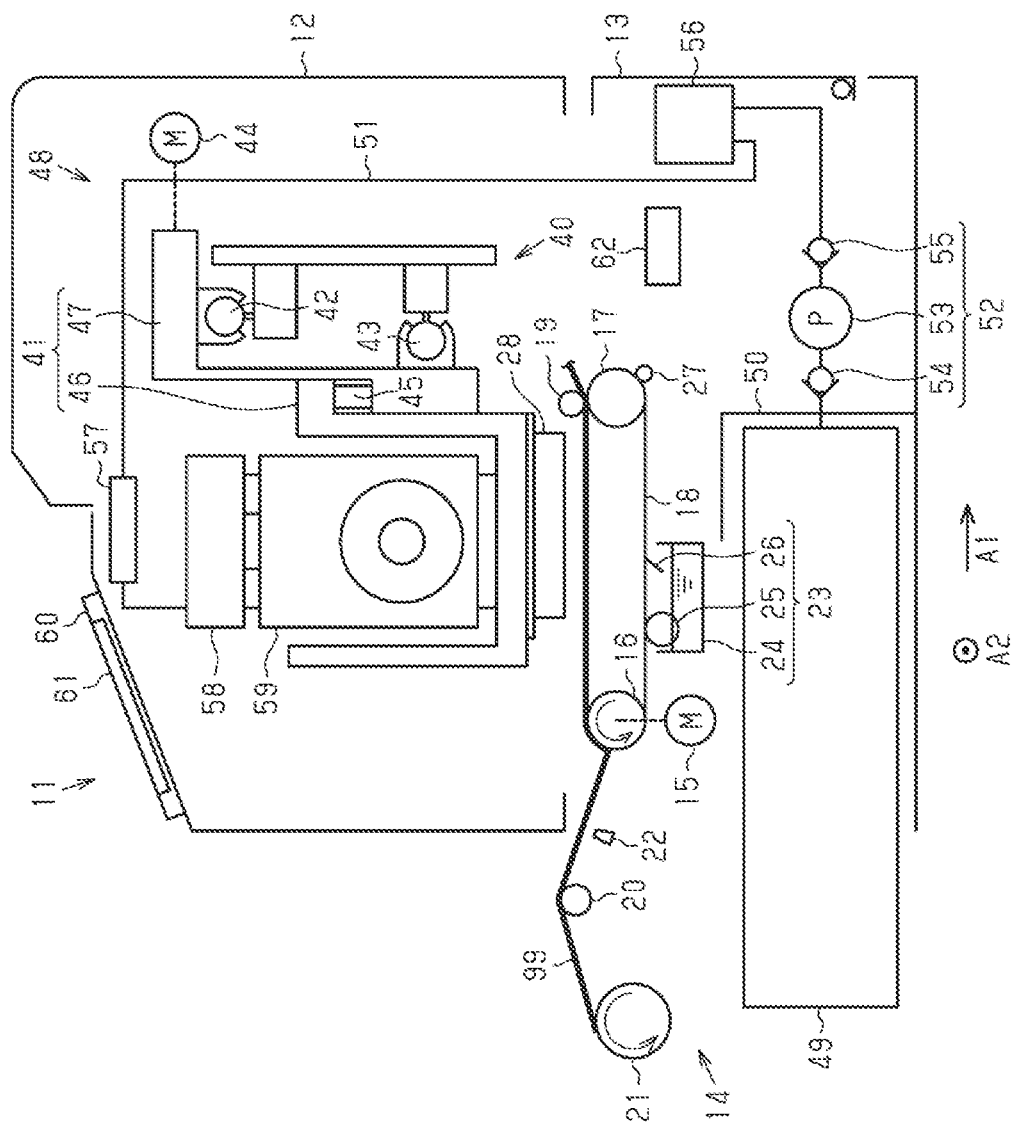
FIG. 1 is a side view illustrating an exemplary embodiment of a liquid ejection apparatus.

As illustrated in FIG. 1, the liquid ejection apparatus 11 includes a housing 12.

The liquid ejection apparatus 11 includes a cover 13. The cover 13 is mounted to the housing 12. The cover 13 can be opened and closed with respect to the housing 12. In FIG. 1, the cover 13 is closed. A user can reach the inside of the housing 12 by opening the cover 13.

The liquid ejection apparatus 11 includes a transport unit 14. The transport unit 14 is configured to transport a medium 99. The transport unit 14 includes a transport motor 15, a first pulley 16, a second pulley 17, and a transport belt 18, for example.

The first pulley 16 is coupled to the transport motor 15. The first pulley 16 is rotated by the transport motor 15. The transport belt 18 is wound around the first pulley 16 and the second pulley 17. When the first pulley 16 is rotated, the transport belt 18 revolves along the first pulley 16 and the second pulley 17. The medium 99 adheres to the transport belt 18. An adhesive is applied to the transport belt 18, for example. With this, the transport belt 18 supports the medium 99. The transport belt 18 revolves to transport the medium 99. The medium 99 may adhere to the transport belt 18 with static electricity, suction, and the like, instead of adhesion.

The transport unit 14 may include a pressing roller 19. The pressing roller 19 is a roller that presses the medium 99 against the transport belt 18. The pressing roller 19 presses the medium 99 against the transport belt 18, and thus the medium 99 easily adheres to the transport belt 18.

The transport unit 14 may include a peeling roller 20. The peeling roller 20 is a roller that peels the medium 99 off from the transport belt 18. The medium 99 is wound around the peeling roller 20.

The transport unit 14 may include a winding unit 21. The winding unit 21 rotates to wind the medium 99. The winding unit 21 winds the medium 99, and thus the peeling roller 20 peels the medium 99 off from the transport belt 18. The medium 99 may be peeled off from the transport belt 18 by, for example, being transported to an apparatus different from the liquid ejection apparatus 11.

The liquid ejection apparatus 11 may include a peeling sensor 22. The peeling sensor 22 is a sensor that detects a position of the medium 99 peeled off from the transport belt 18. The peeling sensor 22 is an optical sensor, for example. For example, the peeling sensor 22 detects a distance to the medium 99 peeled off from the transport belt 18, to detect a position of the medium 99 peeled off from the transport belt 18.

The position at which the medium 99 is peeled off from the transport belt 18 is changed due to a winding speed of the winding unit 21, for example. When the winding speed is higher, the tension applied to the medium 99 is increased. Thus, the position at which the medium 99 is peeled off from the transport belt 18 is shifted upstream on the transport belt 18. In contrast, when the winding speed is lower, the position at which the medium 99 is peeled off from the transport belt 18 is shifted downward on the transport belt 18. Therefore, the liquid ejection apparatus 11 is capable of controlling the position at which the medium 99 is peeled off from the transport belt 18 by controlling the winding unit 21, based on the detection result of the peeling sensor 22.

The liquid ejection apparatus 11 may include a cleaning unit 23. The cleaning unit 23 is a unit that cleans the transport belt 18. A foreign material such as a powdery matter and a fluff that are generated from the medium 99, dust in the air, and a liquid used for printing may adhere to the transport belt 18 in some cases. When a foreign material adheres to the transport belt 18, there may be a possibility that an adhesive force of the transport belt 18 is degraded. Further, when a foreign material adheres to the transport belt 18, there may be a possibility that the foreign material is transferred onto the medium 99. When the cleaning unit 23 cleans the transport belt 18, such possibility can be suppressed.

The cleaning unit 23 includes a reservoir tank 24, a cleaning brush 25, and a cleaning wiper 26, for example. The reservoir tank 24 stores a cleaning liquid. The cleaning liquid is used for cleaning the transport belt 18. The cleaning liquid is water, for example. the cleaning brush 25 is a brush that contacts with the transport belt 18. The cleaning brush 25 rotates with respect to the transport belt 18 to remove a foreign material adhering to the transport belt 18. The cleaning brush 25 is positioned so that a part thereof is immersed in the cleaning liquid stored in the reservoir tank 24. Therefore, the cleaning brush 25 in a wet state cleans the transport belt 18. The cleaning wiper 26 contacts with the transport belt 18 to remove the cleaning liquid adhering to the transport belt 18. In other words, the cleaning wiper 26 removes the cleaning liquid that is caused to adhere to the transport belt 18 by the cleaning brush 25.

The liquid ejection apparatus 11 may include a drying unit 27. The drying unit 27 is configured to dry the transport belt 18 after cleaning. The transport belt 18 after cleaning may be wet with a cleaning liquid. Thus, the drying unit 27 dries the transport belt 18 to suppress a possibility that the cleaning liquid adheres to the medium 99 via the transport belt 18.

For example, the drying unit 27 is an absorbing roller that contacts with the transport belt 18 to absorb the cleaning liquid adhering to the transport belt 18. With this, drying of the transport belt 18 is promoted. For example, the drying unit 27 may be a heater that heats the transport belt 18 to dry the transport belt 18 or a blower that blows air onto the transport belt 18 to dry the transport belt 18.

The liquid ejection apparatus 11 includes an ejection unit 28. The ejection unit 28 is configured to eject a liquid onto the medium 99. The ejection unit 28 ejects a liquid onto the medium 99 supported on the transport belt 18. With this, an image is printed on the medium 99.

Figure 2:
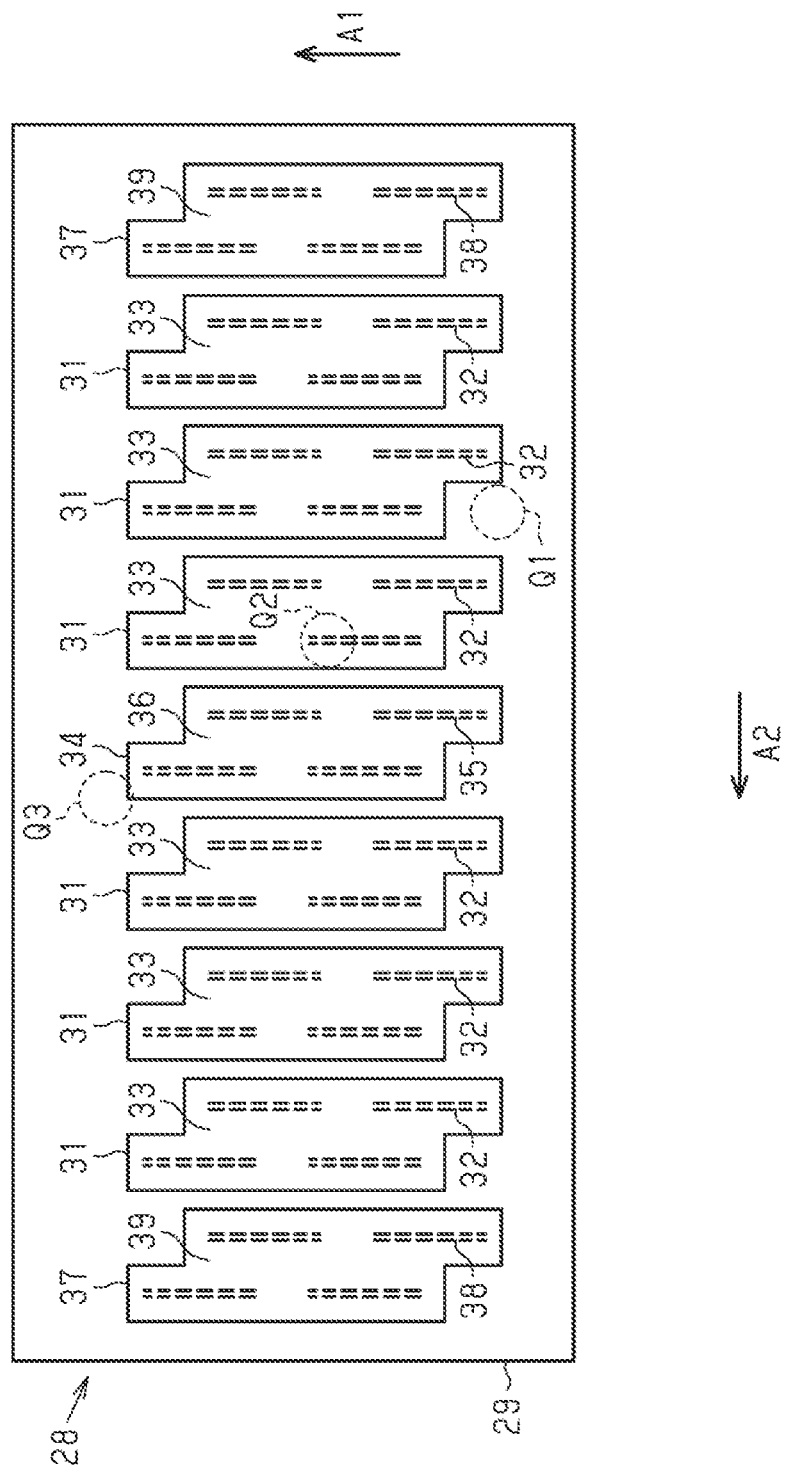
FIG. 2 is a bottom view of an ejection unit.

As illustrated in FIG. 2, the ejection unit 28 includes a holding unit 29 and one or more ejection units. The holding unit 29 holds the one or more ejection units. An opening from which the ejection portion is exposed is formed in the bottom surface of the holding unit 29. The ejection unit is configured to eject a liquid. The ejection unit includes a nozzle surface in which one or more nozzles are opened. The nozzle surface is a surface that is expanded in a first direction A1 and a second direction A2. The nozzle surface is flush with the bottom surface of the holding unit 29, for example. On the nozzle surface, one or more nozzle rows may be formed. The nozzle row is configured by a plurality of nozzles arrayed in a line in the first direction A1. The ejecting unit includes eight nozzle rows, for example.

The ejection unit 28 includes one or more first ejection units 31. The ejection unit 28 includes six first ejection units 31, for example. The six first ejection units 31 are arrayed in the second direction A2. The first ejection unit 31 includes a first nozzle surface 33 in which one or more first nozzles 32 are opened. The first ejection unit 31 ejects a first liquid from the first nozzle 32. The first liquid is a liquid that forms a color of an image printed on the medium 99. The first liquid is pigmented ink, for example. In the first ejection unit 31, the nozzle rows may eject ink of different colors.

The ejection unit 28 includes one second ejection unit 34, for example. The second ejection unit 34 is arrayed with the first ejection unit 31 in the second direction A2, for example. Specifically, the second ejection unit 34 is positioned between the three first ejection units 31 and the three first ejection units 31 in the second direction A2. With this, the second ejection unit 34 is capable of eject a liquid onto the medium 99 while the first ejection unit 31 ejects a liquid onto the medium 99.

The second ejection unit 34 includes a second nozzle surface 36 in which one or more second nozzles 35 are opened. The second ejection unit 34 ejects a second liquid from the second nozzle 35. The second liquid is a liquid containing a component for coagulating the first liquid. The second liquid is mixed with the first liquid to flocculate the pigment in the first liquid. With this, the first liquid is easily fixed on the medium 99. As a result, image quality is improved. The first liquid and the second liquid are simultaneously ejected onto the medium 99, and hence reaction between the first liquid and the second liquid on the medium 99 is improved.

The ejection unit 28 may include one or more third ejection units 37. The ejection unit 28 includes two third ejection unit 37, for example. The third ejection unit 37 is arrayed with the first ejection unit 31 and the second ejection unit 34 in the second direction A2, for example. Specifically, the two third ejection units 37 are ejection units that are positioned on both the ends, among the plurality of ejection units arrayed in the second direction A2. The third ejection unit 37 includes a third nozzle surface 39 in which one or more third nozzles 38 are opened. The third ejection unit 37 ejects a third liquid from the third nozzle 38. The third liquid is a liquid that covers an image printed on the medium 99, specifically, an overcoat liquid.

As illustrated in FIG. 1, the liquid ejection apparatus 11 may include a moving unit 40. The moving unit 40 is configured to move the ejection unit 28. For example, the moving unit 40 includes a carriage 41, a first guide shaft 42, a second guide shaft 43, a carriage motor 44, and an adjustment mechanism 45.

The carriage 41 includes the ejection unit 28 mounted thereto. The carriage 41 includes a main body part 46 and a base part 47. The main body part 46 is a part to which the ejection unit 28 is mounted. The base part 47 is a part that contacts with the first guide shaft 42 and the second guide shaft 43.

The first guide shaft 42 and the second guide shaft 43 are cylindrical rods, for example. The first guide shaft 42 and the second guide shaft 43 guide movement of the carriage 41. With this, the carriage 41 reciprocates in the second direction A2, in other words, performs scanning with respect to the medium 99. Thus, the liquid ejection apparatus 11 is a serial printer. The liquid ejection apparatus 11 may be a line printer capable of ejecting a liquid simultaneously over the entire width of the medium 99.

The carriage motor 44 is a motor that moves the carriage 41. The carriage motor 44 moves the carriage 41 via a timing belt, which is omitted in illustration, for example.

The adjustment mechanism 45 is a mechanism that adjusts a position of the ejection unit 28. The adjustment mechanism 45 moves the main body part 46 with respect to the base part 47 to adjust a position of the ejection unit 28. Specifically, the adjustment mechanism 45 moves the main body part 46 in a vertical direction to adjust a distance between the ejection unit 28 and the medium 99.

The liquid ejection apparatus 11 includes a supply mechanism 48. The supply mechanism 48 is a mechanism that supplies a liquid to the ejection unit 28. The supply mechanism 48 supplies the liquid from a liquid storage unit 49 to the ejection unit 28. The liquid storage unit 49 is removably mounted to the liquid ejection apparatus 11. The liquid storage unit 49 is a cartridge that accommodates a liquid, for example.

The supply mechanism 48 includes a mounting unit 50. The mounting unit 50 is configured so that one or more the liquid storage unit 49 are mounted thereto. When the ejection unit 28 ejects a plurality of types of liquids, a plurality of liquid storage units 49 that store different types of liquids are mounted to the mounting unit 50. The supply mechanism 48 independently supplies the plurality of liquids of different types.

The supply mechanism 48 includes a supply flow path 51. The supply flow path 51 is a flow path in which the liquid flows from the liquid storage unit 49 to the ejection unit 28. The supply flow path 51 includes a tube, for example. The supply flow path 51 is coupled to the mounting unit 50 and the ejection unit 28.

The supply mechanism 48 includes a supply pump 52. The supply pump 52 is positioned in the supply flow path 51. The supply pump 52 causes the liquid to flow in the supply flow path 51. For example, the supply pump 52 includes a diaphragm pump 53, a suction valve 54, and a discharge valve 55. The suction valve 54 and the discharge valve 55 are one-way valves. The suction valve 54 is positioned upstream of the diaphragm pump 53 in the supply flow path 51. The suction valve 54 allows the liquid to flow from the liquid storage unit 49 to the diaphragm pump 53. The discharge valve 55 is positioned downstream of the diaphragm pump 53 in the supply flow path 51. The discharge valve 55 allows the liquid to flow from the diaphragm pump 53 to the ejection unit 28.

The supply pump 52 is capable of pressurizing the liquid in the ejection unit. With this, the supply pump 52 is capable of performing pressure-cleaning. Pressure-cleaning is maintenance work for forcefully discharging the liquid from the nozzle by pressurizing the liquid in the ejection unit by the supply pump 52. Through pressure-cleaning, bubbles, a foreign material, and the like are discharged together with the liquid from the inside of the ejection unit.

The supply mechanism 48 may include a filter unit 56. The filter unit 56 is positioned in the supply flow path 51. Specifically, the filter unit 56 is positioned downstream of the supply pump 52 in the supply flow path 51. The filter unit 56 is configured to remove bubbles, a foreign material, and the like from the liquid flowing in the supply flow path 51. The filter unit 56 is removably mounted to the supply flow path 51. The filter unit 56 is replaceable by opening the cover 13.

The supply mechanism 48 may include a static mixer 57. The static mixer 57 is positioned in the supply flow path 51. Specifically, the static mixer 57 is positioned downstream of the filter unit 56 in the supply flow path 51. The static mixer 57 configured to stir the liquid flowing in the supply flow path 51.

The supply mechanism 48 may include a reservoir unit 58. The reservoir unit 58 is positioned in the supply flow path 51. Specifically, the reservoir unit 58 is positioned downstream of the static mixer 57 in the supply flow path 51. The reservoir unit 58 is configured to store the liquid temporarily.

The supply mechanism 48 may include a pressure adjustment unit 59. The pressure adjustment unit 59 is positioned in the supply flow path 51. Specifically, the pressure adjustment unit 59 is positioned downward of the reservoir unit 58 in the supply flow path 51. The pressure adjustment unit 59 is configured to adjust a pressure of a liquid. The pressure adjustment unit 59 includes a differential pressure regulating valve that is opened and closed by a pressure difference, for example. The pressure adjustment unit 59 maintains a pressure in the ejection unit to a constant value. During pressure-cleaning, the pressure adjustment unit 59 releases the inside of the ejection unit.

The liquid ejection apparatus 11 includes a notification unit 60. The notification unit 60 is configured to notify a user of information. The notification unit 60 includes a display unit 61, for example. The notification unit 60 performs notification of information through display of the display unit 61. The display unit 61 is mounted to the housing 12, for example. The display unit 61 is a touch panel, for example. The notification unit 60 receives an operation from a user via the display unit 61, for example. The notification unit 60 may receive an operation from a user, for example via a button, a lever, or the like, in place of the touch panel. The notification unit 60 may include a lamp, in place of the display unit 61, for example. The notification unit 60 may perform notification of information with a lighting pattern of the lamp. Notification contents of the notification unit 60 are described later.

The liquid ejection apparatus 11 includes a control unit 62. The control unit 62 is configured to control the liquid ejection apparatus 11. The control unit 62 controls the transport unit 14, the ejection unit 28, the moving unit 40, the supply mechanism 48, and the like, for example.

The control unit 62 may be configured as one or more processors that execute various types of processing according to a computer program. The control unit 62 may be configured as one or more dedicated hardware circuits such as an application specific integrated circuit that executes at least a part of various kinds of processing. The control unit 62 may be configured as a circuit including a combination of a processor and a hardware circuit. The processor includes a CPU and memory such as RAM and ROM. The memory stores program codes or commands configured to execute processing on the CPU. The memory, that is, a computer-readable medium, includes any readable medium that can be accessed by a general purpose or special purpose computer.

Figures 3, 4:
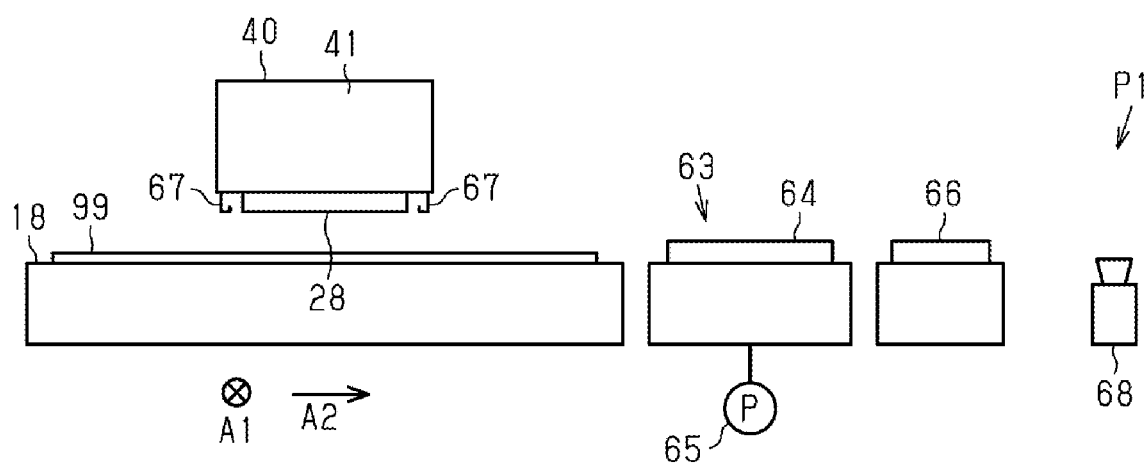
FIG. 3 is a schematic view of the liquid ejection apparatus as viewed from the front.
FIG. 4 is a table showing a correlation between an adhesion position and recovery processing.

As illustrated in FIG. 3, the liquid ejection apparatus 11 includes a cap unit 63. The cap unit 63 is arrayed with the transport belt 18 in the second direction A2, for example. The cap unit 63 is a unit that performs capping on the ejection unit. Capping is maintenance work for moisturizing the nozzle through contact with the nozzle surface.

The cap unit 63 includes one or more caps 64. The cap unit 63 includes a plurality of caps 64 so as to perform capping of the plurality of ejection units, respectively, for example. The cap 64 contacts with the nozzle surface to form, in the cap 64, a space communicated with the nozzle. With this, the nozzle is moisturized. For example, the cap 64 contacts with the first nozzle surface 33 to moisturize the first nozzle 32. For example, the cap 64 contacts with the second nozzle surface 36 to moisturize the second nozzle 35. For example, the cap 64 contacts with the third nozzle surface 39 to moisturize the third nozzle 38. The cap 64 may receive a liquid discharged during pressure-cleaning.

The cap unit 63 may include a suction pump 65. The suction pump 65 is coupled to the cap 64. The suction pump 65 sucks the inside of the cap 64 to suck the nozzle. With this, the cap unit 63 is capable of performing suction-cleaning. Suction-cleaning is maintenance work for forcefully discharging the liquid from the nozzle by sucking the inside of the cap 64 by the suction pump 65 in a capping state. The cap unit 63 may perform suction-cleaning for each of the ejection units, or may perform suction-cleaning collectively for the plurality of ejection units.

The liquid ejection apparatus 11 includes a wiping unit 66. The wiping unit 66 is arrayed with the cap unit 63 in the second direction A2, for example. The wiping unit 66 is configured to wipe the ejection unit. The wiping unit 66 is a fabric wiper, for example. The wiping unit 66 wipes the nozzle surface to remove a liquid adhering to the nozzle surface. When pressure-cleaning, suction-cleaning, or the like is performed, the liquid is discharged from the nozzle, and hence the liquid easily adheres to the nozzle surface. Thus, for example, the wiping unit 66 wipes the nozzle surface after pressure-cleaning, suction-cleaning, or the like.

The wiping unit 66 wipes the first nozzle surface 33 or the second nozzle surface 36, or both of the surfaces. The wiping unit 66 may wipe the third nozzle surface 39, in addition to the first nozzle surface 33 and the second nozzle surface 36. The liquid ejection apparatus 11 may include a plurality of wiping units 66 corresponding to the plurality of nozzle surfaces.

When the wiping unit 66 and the ejection unit 28 relatively move, the wiping unit 66 wipes the nozzle surface in a wiping direction. The wiping direction is the first direction A1, for example. Thus, the wiping unit 66 moves in the first direction A1 with respect to the ejection unit 28 to wipe the nozzle surface, for example. The first direction A1 is a direction opposite to the direction in which the medium 99 moves on the transport belt 18, for example. The wiping unit 66 wipes the nozzle surface for each of the ejection units.

The liquid ejection apparatus 11 includes a detection unit 67. The detection unit 67 is configured to detect contact between the ejection unit 28 and the medium 99. For example, the detection unit 67 includes a piezoelectric element that contacts with the medium 99 to generate a current. The detection unit 67 is mounted to the moving unit 40, for example. Specifically, the detection unit 67 is mounted to the carriage 41 so as to sandwich the ejection unit 28 in the second direction A2. When the medium 99 contacts with the detection unit 67, it is highly likely that the medium 99 contacts with the ejection unit 28. Thus, when the detection unit 67 itself contacts with the medium 99, the detection unit 67 detects contact between the ejection unit 28 and the medium 99.

In the liquid ejection apparatus 11, the medium 99 is turned up from the transport belt 18 in some cases. In such a case, the medium 99 floats up from the transport belt 18. Thus, there may be a possibility that the medium 99 contacts with the ejection unit 28, particularly with the nozzle surface. When the medium 99 contacts with the nozzle surface, there may be a possibility that a foreign material adheres to the nozzle surface. When a foreign material adheres to the nozzle surface, there may be a possibility that the liquid is not normally ejected from the nozzle.

When the medium 99 contacts with the nozzle surface, there may be a possibility that a coagulated matter formed from the first liquid and the second liquid adheres to the nozzle surface. For example, when the medium 99 contacts with the nozzle surface, there may be a possibility that a coagulated matter on the medium 99 is transferred onto the nozzle surface. For example, when the first liquid adhering to the medium 99 is transferred onto the second nozzle surface 36, there may be a possibility that a coagulated matter is generated on the second nozzle surface 36. For example, when the second liquid adhering to the medium 99 is transferred onto the first nozzle surface 33, there may be a possibility that a coagulated matter is generated on the first nozzle surface 33. For example, when the first liquid adhering to the medium 99 is transferred onto the nozzle surface, there may be a possibility that a coagulated matter is generated on the first nozzle surface due to mist of the second liquid. For example, when the medium 99 contacts with the nozzle surface, the medium 99 sucks the liquid out of the nozzle. With this, there may be a possibility that a coagulated matter is generated between the medium 99 and the nozzle surface.

In a case in which a coagulated matter adheres to the nozzle surface, the wiping unit 66 wipes the nozzle surface, there may be a possibility that the wiping unit 66 pushes a coagulated matter into the nozzle. For example, when a coagulated matter enters the first nozzle 32, the first liquid reacts with a coagulated matter in the first nozzle 32. With this, there may be a possibility that the first nozzle 32 is clogged with a coagulated matter. For example, the same holds true when a coagulated matter enters the second nozzle 35. Therefore, in the liquid ejection apparatus 11, it is required to execute suitable recovery processing in accordance with an adhesion position of a coagulated matter.

The liquid ejection apparatus 11 may include an image capturing unit 68. The image capturing unit 68 is arrayed with the wiping unit 66 in the second direction A2, for example. The image capturing unit 68 is configured to capture an image of the nozzle surface. The image capturing unit 68 is a digital camera, for example. The image capturing unit 68 captures an image of the first nozzle surface 33 or the second nozzle surface 36, or both of the surfaces. The image capturing unit 68 may capture an image of the third nozzle surface 39. An image captured by the image capturing unit 68 is displayed by the display unit 61. The image capturing unit 68 captures an image of the nozzle surface so that a user can confirm presence or absence of a coagulated matter on the nozzle surface, an adhesion position of a coagulated matter, or the like. For example, when the detection unit 67 detects contact with the medium 99, the image capturing unit 68 captures an image of the nozzle surface. A user can confirm the nozzle surface by viewing the display unit 61.

Presence or absence of a coagulated matter and an adhesion position of a coagulated matter may be confirmed not only by viewing an image captured by the image capturing unit 68, but also by visually and directly recognize the nozzle surface by a user. For example, when the detection unit 67 detects contact with the medium 99, the moving unit 40 may move the ejection unit to a confirmation position P1. The confirmation position P1 is a position of the ejection unit 28, where a user can visually and directly recognize the nozzle surface. At the confirmation position P1, a user can visually and directly recognize the first nozzle surface 33 or the second nozzle surface 36, or both of the surfaces. At the confirmation position P1, a user may visually and directly recognize the third nozzle surface 39. A user can confirm presence or absence of a coagulated matter on the nozzle surface, an adhesion position of a coagulated matter, or the like by visually and directly recognizing the nozzle surface.

Notification Contents

Next, notification contents of the notification unit 60 are described. When the detection unit 67 detects contact between the ejection unit 28 and the medium 99, the notification unit 60 performs notification of information for prompting confirmation of the nozzle surface. For example, the notification unit 60 causes the display unit 61 to display a message for urging a user to confirm the nozzle surface so that the user confirms the nozzle surface. With this, a user can confirm the nozzle surface. Therefore, a control method for the liquid ejection apparatus 11 includes detecting contact between the ejection unit 28 and the medium 99 and performing notification of information for prompting confirmation of the first nozzle surface 33 and the second nozzle surface 36 when contact between the ejection unit 28 and the medium 99 is detected. When a coagulated matter adheres to the nozzle surface, a user removes a coagulated matter adhering to the nozzle surface. At timing when the notification unit 60 performs notification of information for prompting confirmation of the nozzle surface, the image capturing unit 68 may automatically capture an image of the nozzle surface, or the moving unit 40 may automatically move the ejection unit 28 to the confirmation position P1.

The notification unit 60 may perform notification of guide information. The guide information is information indicating the recovery processing corresponding to an adhesion position of a coagulated matter. In other words, the guide information is information indicating the suitable recovery processing corresponding to an adhesion position of a coagulated matter. The guide information may be information indicating only the recovery processing corresponding to an adhesion position selected by a user or information in which a plurality of types of recovery processing are listed for different adhesion positions. A user confirms the guide information. With this, the suitable recovery processing corresponding to an adhesion position of a coagulated matter can be executed.

As illustrated in FIG. 4, for example, the recovery processing contains a plurality of types of processing corresponding to adhesion positions of a coagulated matter. When an adhesion position of a coagulated matter is a first position, the guide information indicates that first processing is suitable as the recovery processing. When an adhesion position of a coagulated matter is a second position, the guide information indicates that second processing is suitable as the recovery processing. When an adhesion position of a coagulated matter is a third position, the guide information indicates that third processing is suitable as the recovery processing.

As illustrated in FIG. 2, the first processing is recovery processing corresponding to a first position Q1. The first processing is processing in which a coagulated matter is removed from the nozzle surface by using a cleaning stick, pressure-cleaning is then executed, and the wiping unit 66 finally wipes the nozzle surface. The cleaning stick is a cleaning member immersed in a removal liquid for removing a coagulated matter. A user scrapes a coagulated matter off with the cleaning stick to remove a coagulated matter. After that, pressure-cleaning and wiping of the nozzle surface by the wiping unit 66 are performed to remove a removal liquid adhering to the nozzle surface, a coagulated matter remaining on the nozzle surface, and the like. Pressure-cleaning may be omitted in the first processing. However, the nozzle surface is wet by performing pressure-cleaning, and thus a cleaning effect exerted by the wiping unit 66 can be improved.

The first position Q1 is a position upstream of the nozzle in the wiping direction. Specifically, the first position Q1 includes a position upstream of the first nozzle 32 in the wiping direction and a position upstream of the second nozzle 35 in the wiping direction. The first position Q1 may include a position upstream of the third nozzle 38 in the wiping direction. In a case in which a coagulated matter adheres at the first position Q1, when the wiping unit 66 wipes the nozzle surface, there may be a possibility that the wiping unit 66 pushes a coagulated matter into the nozzle. Thus, it is required to remove a coagulated matter before the wiping unit 66 wipes the nozzle surface. Therefore, when an adhesion position of a coagulated matter is the first position Q1, the first processing is suitable.

The second processing is recovery processing corresponding to a second position Q2. The second processing is processing in which the wiping unit 66 wipes the nozzle surface after performing suction-cleaning. In other words, in the second processing, the wiping unit 66 wipes the nozzle surface after performing suction-cleaning instead of pressure-cleaning.

The second position Q2 is a position overlapping with the nozzle. Specifically, the second position Q2 includes a position overlapping with the first nozzle 32 and a position overlapping with the second nozzle 35. The second position Q2 may include a position overlapping with the third nozzle 38. In a case in which a coagulated matter adheres at the second position Q2, when the wiping unit 66 wipes the nozzle surface, there may be a possibility that the wiping unit 66 pushes a coagulated matter into the nozzle. Further, when a coagulated matter is scraped off with the cleaning stick, there may be a possibility that the cleaning stick pushes a coagulated matter into the nozzle. Thus, suction-cleaning is performed to discharge a coagulated matter from the nozzle. When the liquid is discharged from suction-cleaning, viscosity of a coagulated matter is reduced. With this, the wiping unit 66 easily removes the coagulated matter. Further, the liquid is discharged from the nozzle more swiftly during suction-cleaning than during pressure-cleaning. With this, a coagulated matter is easily removed from the nozzle surface. Therefore, when an adhesion position of a coagulated matter is the second position Q2, the second processing is suitable.

The third processing is recovery processing corresponding to a third position Q3. The third processing is processing in which the wiping unit 66 wipes the nozzle surface after performing pressure-cleaning. Pressure-cleaning may be omitted in the third processing. However, the nozzle surface is wet by performing pressure-cleaning, and thus a cleaning effect exerted by the wiping unit 66 can be improved.

The third position Q3 is a position downstream of the nozzle in the wiping direction. Specifically, the third position Q3 includes a position downstream of the first nozzle 32 in the wiping direction and a position downstream of the second nozzle 35 in the wiping direction. The third position Q3 may include a position downstream of the third nozzle 38 in the wiping direction. In a case in which a coagulated matter adheres to the third position Q3, even when the wiping unit 66 wipes the nozzle surface, there is no possibility that a coagulated matter is pushed into the nozzle. Thus, the wiping unit 66 wipes the nozzle surface to remove a coagulated matter from the nozzle surface. Therefore, when an adhesion position of a coagulated matter is the third position Q3, the third processing is suitable.

Figure 5:
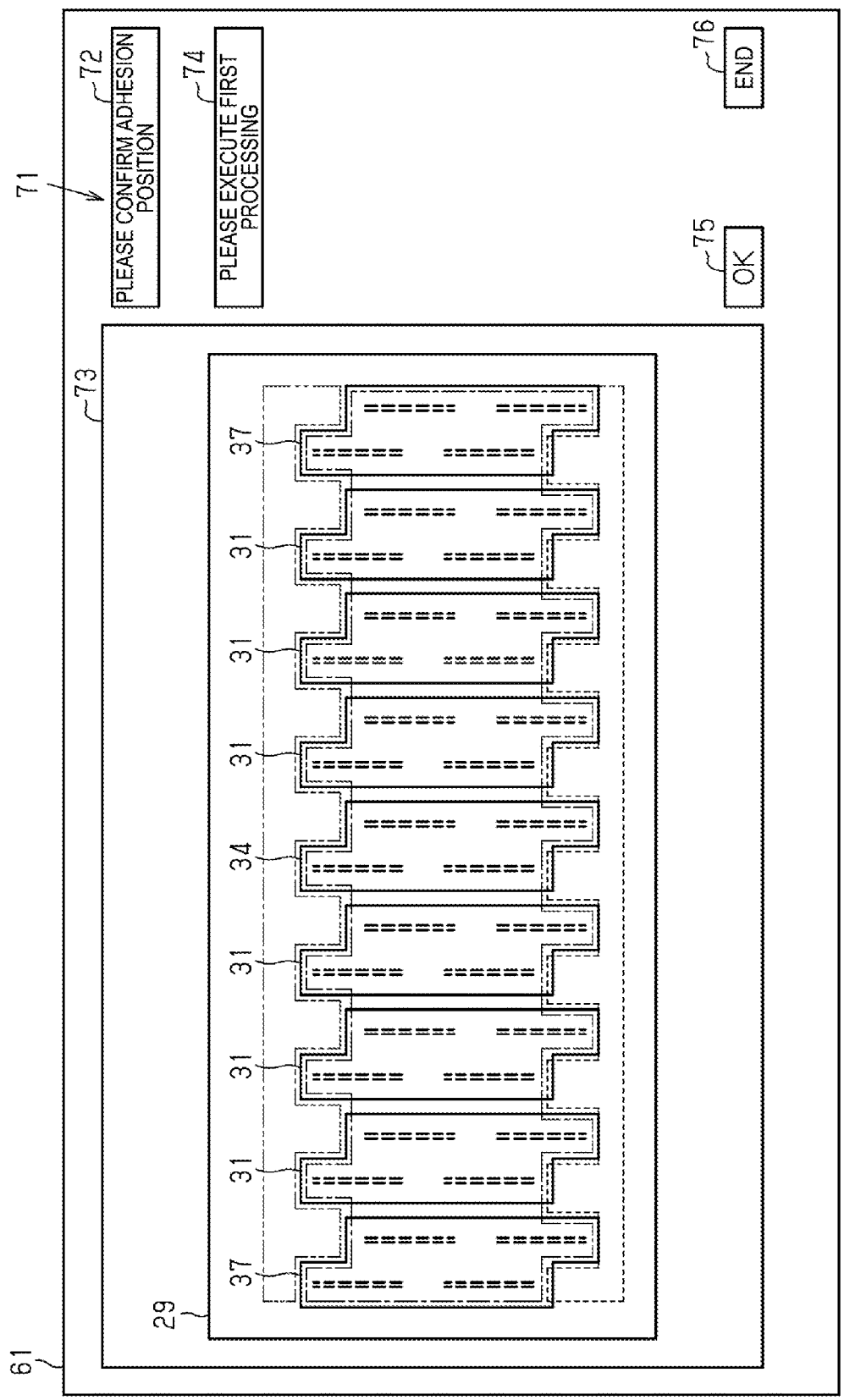
FIG. 5 is a front view illustrating an example of a confirmation screen.

As illustrated in FIG. 5, the display unit 61 may display a confirmation screen 71 containing the guide information. The confirmation screen 71 is a screen for prompting confirmation of an adhesion position of a coagulated matter. For example, the confirmation screen 71 is a screen containing confirmation display 72 for urging confirmation of an adhesion position, a confirmation image 73 for confirming an adhesion position, recovery display 74 being an example of the guide information, and the like. The confirmation display 72 is displayed in the form of a message, for example.

The confirmation image 73 may be an image of the nozzle surface that is captured by the image capturing unit 68 or an illustration image that resembles the nozzle surface. In the confirmation image 73, a region indicated by a dashed line corresponds to the first position Q1, a region indicated by a one-dot chain line corresponds to the second position Q2, and a region indicated by a two-dot chain line corresponds to the third position Q3. For example, a user selects any one of the region indicated by the dashed line, the region indicated by the one-dot chain line, and the region indicated by the two-dot chain line in the confirmation image 73 to specify the adhesion position. The adhesion position may be specified via the display unit 61, or may be specified via a button and a lever.

When the adhesion position is specified, the recovery display 74 is displayed on the confirmation screen 71. The recovery display 74 is display indicating the recovery processing corresponding to the specified adhesion position. The recovery display 74 is displayed in the form of a message, for example. When the region indicated by the dashed line in the confirmation image 73 is specified, the recovery display 74 indicates the first processing. When the region indicated by the one-dot chain line in the confirmation image 73 is specified, the recovery display 74 indicates the second processing. When the region indicated by the two-dot chain line in the confirmation image 73 is specified, the recovery display 74 indicates the third processing. With this, a user can execute the suitable recovery processing corresponding to an adhesion position. At timing when the adhesion position is specified, the recovery processing may automatically be executed.

The display unit 61 may display an OK button 75 on the confirmation screen 71. The OK button 75 is a button for starting execution of the recovery processing, which is displayed on the recovery display 74. A user operates the OK button 75 to execute the recovery processing in the liquid ejection apparatus 11.

For example, when the recovery display 74 indicates the first processing, a user performs cleaning with the cleaning stick, and then operates the OK button 75. With this, pressure-cleaning and wiping of the nozzle surface by the wiping unit 66 are performed. In this case, pressure-cleaning and wiping by the wiping unit 66 may be performed only for the ejection unit positioned downstream of the adhesion position, or pressure-cleaning and wiping by the wiping unit 66 may be performed for all the ejection units.

For example, when the recovery display 74 indicates the second processing, a user operates the OK button 75 to perform suction-cleaning and wiping of the nozzle surface by the wiping unit 66. In this case, suction-cleaning and wiping by the wiping unit 66 may be performed only for the ejection unit including the nozzle specified as the adhesion position, or suction-cleaning and wiping by the wiping unit 66 may be performed for all the ejection units.

For example, when the recovery display 74 indicates the third processing, a user operates the OK button 75 to perform pressure-cleaning and wiping of the nozzle surface by the wiping unit 66. In this case, pressure-cleaning and wiping by the wiping unit 66 may be performed only for the ejection unit positioned upstream of the adhesion position, or pressure-cleaning and wiping by the wiping unit 66 may be performed for all the ejection units.

The display unit 61 may display an end button 76 on the confirmation screen 71. The end button 76 is a button to end display of the confirmation screen 71. When adhesion of a coagulated matter on the nozzle surface is not confirmed, a user operates the end button 76. When the end button 76 is operated, the liquid ejection apparatus 11 may run a nozzle check. During the nozzle check, whether the liquid is normally ejected from the nozzle is inspected. The nozzle check is run by ejecting the liquid from the nozzle onto the medium 99, for example.

Figure 6:
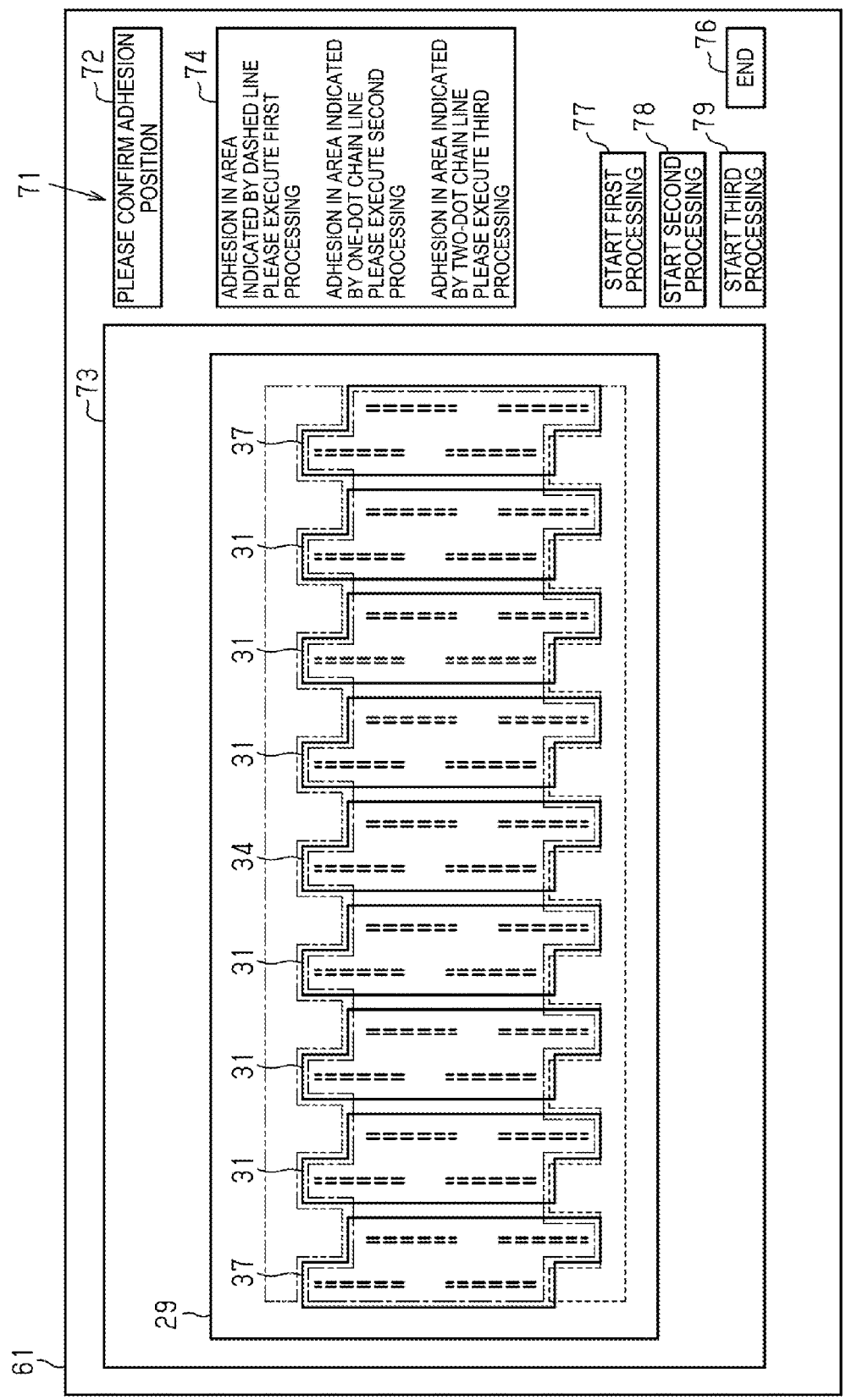
FIG. 6 is a front view illustrating another example of the confirmation screen.

As illustrated in FIG. 6, in the recovery display 74, a combination of the adhesion position and the recovery processing may be listed. In this case, the dashed-line region indicating the first position Q1, the one-dot chain line region indicating the second position, and the two-dot chain line region indicating the third position Q3 are superimposed in the confirmation image 73. In this example, the recovery display 74 is displayed on the confirmation screen 71 without selection of an adhesion position in the confirmation image 73.

The display unit 61 may display a first processing start button 77, the second processing start button 78, and the third processing start button 79 on the confirmation screen 71. The first processing start button 77 is a button for starting the first processing. When the adhesion position is within the region indicated by the dashed line, a user removes a coagulated matter from the nozzle surface with the cleaning stick, and then operates the first processing start button 77. The second processing start button 78 is a button for starting the second processing. When the adhesion position is within the region indicated by the one-dot chain line, a user operates the second processing start button 78. The third processing start button 79 is a button for starting the third processing. When the adhesion position is within the region indicated by the two-dot chain line, a user operates the third processing start button 79.

Functions and Effects

Next, the functions and effects of the exemplary embodiment described above are described.

(1) When the detection unit 67 detects contact between the ejection unit 28 and the medium 99, the notification unit 60 performs notification of information for prompting confirmation of the first nozzle surface 33 and the second nozzle surface 36.

When the ejection unit 28 contacts with the medium 99, there may be a possibility that a coagulated matter formed from the first liquid and the second liquid adheres to the first nozzle surface 33 or the second nozzle surface 36. When a coagulated matter adheres to the nozzle surface, there may be a possibility that the liquid cannot normally be discharged from the nozzle. In particular, when a coagulated matter enters the nozzle, there may be a possibility that the nozzle is clogged with a coagulated matter.

With the configuration described above, the notification from the notification unit 60 causes a user to confirm the first nozzle surface 33 and the second nozzle surface 36. When a coagulated matter adheres to the first nozzle surface 33 or the second nozzle surface 36, a user removes a coagulated matter to prevent a coagulated matter from entering the nozzle. Therefore, a possibility that a problem relating ejection of the liquid arises due to adhesion of a coagulated matter is suppressed.

(2) The notification unit 60 performs notification of information indicating recovery processing corresponding to an adhesion position, that is, guide information, based on an adhesion position of a coagulated matter adhering to the first nozzle surface 33 or the second nozzle surface 36.

With the configuration described above, a user confirms the guide information to grasp the recovery processing corresponding to the adhesion position of the coagulated matter. Therefore, a user can execute the suitable recovery processing corresponding to an adhesion position of a coagulated matter.

(3) The display unit 61 displays an image captured by the image capturing unit 68. When the detection unit 67 detects contact between the ejection unit 28 and the medium 99, the image capturing unit 68 captures an image of the first nozzle surface 33 and the second nozzle surface 36. With the configuration described above, a user can confirm the nozzle surface without visually and directly recognize the nozzle surface. A user can confirm an adhesion position of a coagulated matter by viewing the display unit 61.

(4) When the detection unit 67 detects contact between the ejection unit 28 and the medium 99, the moving unit 40 moves the ejection unit 28 to a position at which the first nozzle surface 33 and the second nozzle surface 36 are visually recognizable by a user. With the configuration described above, it is easy for a user to visually and directly recognize the nozzle surface. A user can confirm an adhesion position of a coagulated matter by visually and directly recognizing the nozzle surface.

(5) The display unit 61 displays, on the confirmation screen 71, the guide information indicating the recovery processing corresponding to the specified adhesion position.

With the configuration described above, a user views the display unit 61. With this, the suitable recovery processing corresponding to an adhesion position of a coagulated matter can be executed.

(6) When a position upstream of the first nozzle 32 in the wiping direction or a position upstream of the second nozzle 35 in the wiping direction is specified as the adhesion position, the display unit 61 displays the guide information indicating the recovery processing for causing a user to remove a coagulated matter with the cleaning member.

When a coagulated matters adheres to a position upstream of the first nozzle 32 in the wiping direction and a position upstream of the second nozzle 35 in the wiping direction, there may be a possibility that a coagulated matter is pushed into the first nozzle 32 or the second nozzle 35 through wiping by the wiping unit 66. Thus, with the configuration described above, a user removes a coagulated matter in advance with the cleaning member, and thus a possibility that a coagulated matter enters the nozzle is suppressed.

(7) When a position overlapping with the first nozzle 32 or a position overlapping with the second nozzle 35 is specified as the adhesion position, the display unit 61 starts suction of the nozzle specified as the adhesion position.

When a coagulated matter adheres to the position overlapping with the first nozzle 32 or the position overlapping with the second nozzle 35, there may be a possibility that a coagulated matter is generated in the nozzle. Thus, with the configuration described above, the nozzle is sucked to discharge the liquid from the nozzle. With this, viscosity of a coagulated matter is reduced. With this, a coagulated matter is easily removed.

(8) When a position downstream of the first nozzle 32 in the wiping direction or a position downstream of the second nozzle 35 in the wiping direction is specified as the adhesion position, the display unit 61 displays the guide information indicating the recovery processing for starting wiping by the wiping unit 66.

When a coagulated matter adheres to a position downstream of the first nozzle 32 in the wiping direction and a position downstream of the second nozzle 35 in the wiping direction, there is no possibility that a coagulated matter is pushed into the first nozzle 32 and the second nozzle 35 through wiping by the wiping unit 66. Thus, with the configuration described above, the wiping unit 66 wipes the first nozzle surface 33 and the second nozzle surface 36. With this, a coagulated matter can be removed.

Technical Concepts

Hereinafter, technical concepts and effects thereof that are understood from the above-described exemplary embodiments and modified examples are described.

(A) A liquid ejection apparatus includes an ejection unit including a first ejection unit having a first nozzle surface in which a first nozzle is opened, the first ejection unit being configured to eject a first liquid from the first nozzle onto a medium, and a second ejection unit having a second nozzle surface in which a second nozzle is opened, the second ejection unit being configured to eject a second liquid from the second nozzle onto a medium, the second liquid containing a component for coagulating the first liquid, a detection unit configured to detect contact between the ejection unit and a medium, and a notification unit configured to perform notification of information for prompting confirmation of the first nozzle surface and the second nozzle surface when the detection unit detects contact between the ejection unit and a medium.

When the ejection unit contacts with the medium, there may be a possibility that a coagulated matter formed from the first liquid and the second liquid adheres to the first nozzle surface or the second nozzle surface. When a coagulated matter adheres to the nozzle surface, there may be a possibility that the liquid cannot normally be discharged from the nozzle. In particular, when a coagulated matter enters the nozzle, there may be a possibility that the nozzle is clogged with a coagulated matter.

With the configuration described above, the notification from the notification unit causes a user to confirm the first nozzle surface and the second nozzle surface. When a coagulated matter adheres to the first nozzle surface or the second nozzle surface, a user removes a coagulated matter to prevent a coagulated matter from entering the nozzle. Therefore, a possibility that a problem relating ejection of the liquid arises due to adhesion of a coagulated matter is suppressed.

(B) In the above-mentioned liquid ejection apparatus, the notification unit may perform notification of information indicating recovery processing corresponding to an adhesion position of a coagulated matter that adheres to the first nozzle surface or the second nozzle surface.

With the configuration described above, a user confirms the information to grasp the recovery processing corresponding to the adhesion position of the coagulated matter. Therefore, a user can execute the suitable recovery processing corresponding to an adhesion position of a coagulated matter.

(C) The above-mentioned liquid ejection apparatus may include an image capturing unit configured to capture an image of the first nozzle surface and the second nozzle surface, the notification unit may include a display unit configured to display an image captured by the image capturing unit, and the image capturing unit may capture an image of the first nozzle surface and the second nozzle surface when the detection unit detects contact between the ejection unit and a medium. With the configuration described above, a user can confirm the nozzle surface without visually and directly recognize the nozzle surface. A user can confirm an adhesion position of a coagulated matter by viewing the display unit.

(D) The above-mentioned liquid ejection apparatus may include a moving unit configured to move the ejection unit, and the moving unit may move the ejection unit to a position at which the first nozzle surface and the second nozzle surface are visually recognizable by a user, when the detection unit detects contact between the ejection unit and a medium. With the configuration described above, it is easy for a user to visually and directly recognize the nozzle surface. A user can confirm an adhesion position of a coagulated matter by visually and directly recognizing the nozzle surface.

(E) In the above-mentioned liquid ejection apparatus, the notification unit may include a display unit configured to display a confirmation screen for prompting confirmation of the adhesion position, and the display unit may display, on the confirmation screen, information indicating the recovery processing corresponding to the adhesion position that is specified. With the configuration described above, a user views the display unit. With this, the suitable recovery processing corresponding to an adhesion position of a coagulated matter can be executed.

(F) The above-mentioned liquid ejection apparatus may include a wiping unit configured to perform wiping on the first nozzle surface and the second nozzle surface in a wiping direction, and the display unit may display information indicating the recovery processing for causing a user to remove a coagulated matter with a cleaning member, when a position upstream of the first nozzle in the wiping direction or a position upstream of the second nozzle in the wiping direction is specified as the adhesion position.

When a coagulated matters adheres to a position upstream of the first nozzle in the wiping direction and a position upstream of the second nozzle in the wiping direction, there may be a possibility that a coagulated matter is pushed into the first nozzle or the second nozzle through wiping by the wiping unit. Thus, with the configuration described above, a user removes a coagulated matter in advance with the cleaning member, and thus a possibility that a coagulated matter enters the nozzle is suppressed.

(G) In the above-mentioned liquid ejection apparatus, the display unit may display information indicating the recovery processing for starting suction of a nozzle specified as the adhesion position, when a position overlapping with the first nozzle or a position overlapping with the second nozzle is specified as the adhesion position.

When a coagulated matter adheres to the position overlapping with the first nozzle or the position overlapping with the second nozzle, there may be a possibility that a coagulated matter is generated in the nozzle. Thus, with the configuration described above, the nozzle is sucked to discharge the liquid from the nozzle. With this, viscosity of a coagulated matter is reduced. With this, a coagulated matter is easily removed.

(H) The above-mentioned liquid ejection apparatus may include a wiping unit configured to perform wiping on the first nozzle surface and the second nozzle surface in a wiping direction, and the display unit may display information indicating the recovery processing for starting wiping by the wiping unit, when a position downstream of the first nozzle in the wiping direction or a position downstream of the second nozzle in the wiping direction is specified as the adhesion position.

When a coagulated matter adheres to a position downstream of the first nozzle in the wiping direction and a position downstream of the second nozzle in the wiping direction, there is no possibility that a coagulated matter is pushed into the first nozzle and the second nozzle through wiping by the wiping unit. Thus, with the configuration described above, the wiping unit wipes the first nozzle surface and the second nozzle surface. With this, a coagulated matter can be removed.

(I) A control method for a liquid ejection apparatus including an ejection unit including a first ejection unit having a first nozzle surface in which a first nozzle is opened, the first ejection unit being configured to eject a liquid from the first nozzle onto a medium, and a second ejection unit having a second nozzle surface in which a second nozzle is opened, the second ejection unit being configured to eject a coagulating liquid from the second nozzle onto a medium, the coagulating liquid containing a component for coagulating the liquid, the control method includes detecting contact between the ejection unit and a medium, and performing notification of information for prompting confirmation of the first nozzle surface and the second nozzle surface when contact between the ejection unit and a medium is detected. According to the above-mentioned method, the effects similar to those of the liquid ejection apparatus described above can be exerted.

What is claimed is:

1. A liquid ejection apparatus, comprising:
an ejection unit including:
a first ejection unit having a first nozzle surface in which a first nozzle is opened, the first ejection unit being configured to eject a first liquid from the first nozzle onto a medium; and
a second ejection unit having a second nozzle surface in which a second nozzle is opened, the second ejection unit being configured to eject a second liquid from the second nozzle onto a medium, the second liquid containing a component for coagulating the first liquid;
a detection unit configured to detect contact between the ejection unit and a medium;
a notification unit configured to display information prompting confirmation of which of the first nozzle surface and the second nozzle surface is contacted by the medium when the detection unit detects contact between the ejection unit and the medium; and
an image capturing unit configured to capture an image of the first nozzle surface and the second nozzle surface, wherein
the notification unit includes a display unit configured to display the image captured by the image capturing unit, and
the image capturing unit captures the image of the first nozzle surface and the second nozzle surface when the detection unit detects contact between the ejection unit and a medium and displays the image on the display unit.

2. The liquid ejection apparatus according to claim 1, wherein
the notification unit is configured to display information indicating a recovery processing to be performed, the recovery processing corresponding to an adhesion position of a coagulated matter that adheres to the first nozzle surface or the second nozzle surface.

3. The liquid ejection apparatus according to claim 2, wherein
the notification unit includes a display unit configured to display a confirmation screen for prompting confirmation of the adhesion position, and
the display unit displays, on the confirmation screen, information indicating the recovery processing corresponding to the adhesion position that is specified.

4. The liquid ejection apparatus according to claim 3, comprising:
a wiping unit configured to perform wiping on the first nozzle surface and the second nozzle surface in a wiping direction, wherein
the display unit displays information indicating the recovery processing for causing a user to remove a coagulated matter with a cleaning member, when a position upstream of the first nozzle in the wiping direction or a position upstream of the second nozzle in the wiping direction is specified as the adhesion position.

5. The liquid ejection apparatus according to claim 3, wherein
the display unit displays information indicating the recovery processing for starting suction of a nozzle specified as the adhesion position, when a position overlapping with the first nozzle or a position overlapping with the second nozzle is specified as the adhesion position.

6. The liquid ejection apparatus according to claim 3, comprising:
a wiping unit configured to perform wiping on the first nozzle surface and the second nozzle surface in a wiping direction, wherein
the display unit displays information indicating the recovery processing for starting wiping by the wiping unit, when a position downstream of the first nozzle in the wiping direction or a position downstream of the second nozzle in the wiping direction is specified as the adhesion position.

7. The liquid ejection apparatus according to claim 1, comprising:
a moving unit configured to move the ejection unit, wherein
the moving unit moves the ejection unit to a position at which the first nozzle surface and the second nozzle surface are visually recognizable by a user, when the detection unit detects contact between the ejection unit and a medium.

8. A control method for a liquid ejection apparatus including an ejection unit including a first ejection unit having a first nozzle surface in which a first nozzle is opened, the first ejection unit being configured to eject a liquid from the first nozzle onto a medium, and a second ejection unit having a second nozzle surface in which a second nozzle is opened, the second ejection unit being configured to eject a coagulating liquid from the second nozzle onto a medium, the coagulating liquid containing a component for coagulating the liquid, the control method comprising:
detecting contact between the ejection unit and a medium;
performing notification of information for prompting confirmation of the first nozzle surface and the second nozzle surface when contact between the ejection unit and a medium is detected; and
capturing an image of the first nozzle surface or the second nozzle surface and displaying the image on a display unit of the notification unit when the detection unit detects contact between the ejection unit and the medium.

9. A liquid ejection apparatus, comprising:
an ejection unit including:
a first ejection unit having a first nozzle surface in which a first nozzle is opened, the first ejection unit being configured to eject a first liquid from the first nozzle onto a medium; and
a second ejection unit having a second nozzle surface in which a second nozzle is opened, the second ejection unit being configured to eject a second liquid from the second nozzle onto a medium, the second liquid containing a component for coagulating the first liquid;
a detection unit configured to detect contact between the ejection unit and a medium;
a notification unit configured to display information prompting confirmation of which of the first nozzle surface and the second nozzle surface is contacted by the medium when the detection unit detects contact between the ejection unit and the medium; and
a moving unit configured to move the ejection unit, wherein
the moving unit moves the ejection unit to a position at which the first nozzle surface and the second nozzle surface are visually recognizable by a user, when the detection unit detects contact between the ejection unit and a medium.

* * * * *